United States Patent
Lisuk et al.

(10) Patent No.: US 10,534,595 B1
(45) Date of Patent: Jan. 14, 2020

(54) TECHNIQUES FOR CONFIGURING AND VALIDATING A DATA PIPELINE DEPLOYMENT

(71) Applicant: PALANTIR TECHNOLOGIES INC., Palo Alto, CA (US)

(72) Inventors: David Lisuk, New York, NY (US); Paul Gribelyuk, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/977,666

(22) Filed: May 11, 2018

Related U.S. Application Data

(60) Provisional application No. 62/527,988, filed on Jun. 30, 2017.

(51) Int. Cl.
*G06F 8/60* (2018.01)
*G06F 8/41* (2018.01)
(Continued)

(52) U.S. Cl.
CPC .................. *G06F 8/60* (2013.01); *G06F 8/30* (2013.01); *G06F 8/433* (2013.01); *G06F 8/71* (2013.01);
(Continued)

(58) Field of Classification Search
None
See application file for complete search history.

(56) References Cited

U.S. PATENT DOCUMENTS

| | | |
|---|---|---|
| 5,418,950 A | 5/1995 | Li et al. |
| 5,428,737 A | 6/1995 | Li et al. |

(Continued)

FOREIGN PATENT DOCUMENTS

| | | |
|---|---|---|
| DE | 102014103482 | 9/2014 |
| EP | 1647908 | 4/2006 |

(Continued)

OTHER PUBLICATIONS

Canese et al., "Chapter 2: PubMed: The Bibliographic Database," The NCBI Handbook, Oct. 2002, pp. 1-10.
Ballesteros et al., "Batching: A Design Pattern for Efficient and Flexible Client/Server Interaction," Transactions on Pattern Languages of Programming, Springer Berlin Heildeberg, 2009, pp. 48-66.

(Continued)

*Primary Examiner* — Wei Y Zhen
*Assistant Examiner* — Binh Luu
(74) *Attorney, Agent, or Firm* — Hickman Palermo Becker Bingham LLP

(57) ABSTRACT

Techniques for configuring and validating a data pipeline system deployment are described. In an embodiment, a template is a file or data object that describes a package of related jobs. For example, a template may describe a set of jobs necessary for deduplication of data records or a set of jobs performing machine learning on a set of data records. The template can be defined in a file, such as a JSON blob or XML file. For each job specified in the template, the template may identify a set of dataset dependencies that are needed as input for the processing of that job. For each job specified in the template, the template may further identify a set of configuration parameters needed for deployment of the job. In an embodiment, a server uses the template and the configuration parameter values collected via the GUI to generate code for the package of jobs. The code may be stored in a version control system. In an embodiment, the code may be compiled, executed, and deployed to a server for processing the data.

18 Claims, 9 Drawing Sheets

(51) Int. Cl.
  *G06F 8/71* (2018.01)
  *G06F 9/445* (2018.01)
  *G06F 8/30* (2018.01)
  *G06F 9/451* (2018.01)
  *G06N 20/00* (2019.01)

(52) U.S. Cl.
  CPC .......... *G06F 9/44505* (2013.01); *G06F 9/451* (2018.02); *G06N 20/00* (2019.01)

(56) References Cited

U.S. PATENT DOCUMENTS

| | | | |
|---|---|---|---|
| 5,428,776 | A | 6/1995 | Rothfield |
| 5,542,089 | A | 7/1996 | Lindsay et al. |
| 5,608,899 | A | 3/1997 | Li et al. |
| 5,613,105 | A | 3/1997 | Xbikowski et al. |
| 5,701,456 | A | 12/1997 | Jacopi et al. |
| 5,724,575 | A | 3/1998 | Hoover et al. |
| 5,794,228 | A | 8/1998 | French et al. |
| 5,794,229 | A | 8/1998 | French et al. |
| 5,857,329 | A | 1/1999 | Bingham |
| 5,911,138 | A | 6/1999 | Li et al. |
| 5,918,225 | A | 6/1999 | White et al. |
| 6,208,985 | B1 | 3/2001 | Krehel |
| 6,236,994 | B1 | 5/2001 | Swartz et al. |
| 6,289,334 | B1 | 9/2001 | Reiner et al. |
| 6,311,181 | B1 | 10/2001 | Lee et al. |
| 6,321,274 | B1 | 11/2001 | Shakib et al. |
| 6,643,613 | B2 | 11/2003 | McGee et al. |
| 6,745,382 | B1 | 6/2004 | Zothner |
| 6,851,108 | B1 | 2/2005 | Syme et al. |
| 6,857,120 | B1 | 2/2005 | Arnold et al. |
| 6,877,137 | B1 | 4/2005 | Rivette et al. |
| 6,976,024 | B1 | 12/2005 | Chavez et al. |
| 7,028,223 | B1 | 4/2006 | Kolawa et al. |
| 7,085,890 | B2 | 8/2006 | Kashyap |
| 7,155,728 | B1 | 12/2006 | Prabhu et al. |
| 7,216,133 | B2 | 5/2007 | Wu et al. |
| 7,406,592 | B1 | 7/2008 | Polyudov |
| 7,519,589 | B2 | 4/2009 | Charnock et al. |
| 7,546,353 | B2 | 6/2009 | Hesselink et al. |
| 7,610,290 | B2 | 10/2009 | Kruy et al. |
| 7,627,489 | B2 | 12/2009 | Schaeffer et al. |
| 7,783,679 | B2 | 8/2010 | Bley |
| 7,853,573 | B2 | 12/2010 | Warner et al. |
| 7,877,421 | B2 | 1/2011 | Berger et al. |
| 7,908,521 | B2 | 3/2011 | Sridharan et al. |
| 7,979,424 | B2 | 7/2011 | Dettinger et al. |
| 8,073,857 | B2 | 12/2011 | Sreekanth |
| 8,103,962 | B2 | 1/2012 | Embley et al. |
| 8,417,715 | B1 | 4/2013 | Bruckhaus et al. |
| 8,429,194 | B2 | 4/2013 | Aymeloglu et al. |
| 8,433,702 | B1 | 4/2013 | Carrino et al. |
| 8,499,287 | B2 | 7/2013 | Shafi et al. |
| 8,560,494 | B1 | 10/2013 | Downing |
| 8,639,552 | B1 | 1/2014 | Chen et al. |
| 8,799,867 | B1 | 8/2014 | Peri-Glass et al. |
| 8,909,597 | B2 | 12/2014 | Aymeloglu et al. |
| 8,924,429 | B1 | 12/2014 | Fisher et al. |
| 8,935,201 | B1 | 1/2015 | Fisher et al. |
| 9,031,981 | B1 | 5/2015 | Potter et al. |
| 9,105,000 | B1 | 8/2015 | White et al. |
| 9,292,388 | B2 | 3/2016 | Fisher et al. |
| 9,330,120 | B2 | 5/2016 | Colgrove et al. |
| 9,348,677 | B2 | 5/2016 | Marinelli, III et al. |
| 9,378,526 | B2 | 6/2016 | Sampson |
| 10,176,217 | B1* | 1/2019 | Dang .................... G06F 16/254 |
| 2002/0184111 | A1 | 12/2002 | Swanson |
| 2003/0004770 | A1 | 1/2003 | Miller et al. |
| 2003/0023620 | A1 | 1/2003 | Trotta |
| 2003/0105833 | A1 | 6/2003 | Daniels |
| 2003/0212670 | A1 | 11/2003 | Yalamanchi et al. |
| 2004/0088177 | A1 | 5/2004 | Travis et al. |
| 2004/0098731 | A1 | 5/2004 | Demsey et al. |
| 2004/0103088 | A1 | 5/2004 | Cragun et al. |
| 2004/0126840 | A1 | 7/2004 | Cheng et al. |
| 2004/0139212 | A1 | 7/2004 | Mukherjee et al. |
| 2004/0153837 | A1 | 8/2004 | Preston et al. |
| 2004/0193608 | A1 | 9/2004 | Gollapudi et al. |
| 2004/0254658 | A1 | 12/2004 | Sherriff et al. |
| 2004/0260702 | A1 | 12/2004 | Cragun et al. |
| 2005/0004911 | A1 | 1/2005 | Goldberg et al. |
| 2005/0021397 | A1 | 1/2005 | Cui et al. |
| 2005/0043979 | A1* | 2/2005 | Soares ............ G06Q 10/06398 705/7.42 |
| 2005/0044099 | A1* | 2/2005 | Soares ............... G06Q 30/0603 707/999.1 |
| 2005/0060662 | A1* | 3/2005 | Soares .................. G06Q 10/06 715/810 |
| 2005/0120080 | A1 | 6/2005 | Weinreb et al. |
| 2005/0183005 | A1 | 8/2005 | Denoue et al. |
| 2005/0226473 | A1 | 10/2005 | Ramesh |
| 2005/0235274 | A1* | 10/2005 | Mamou ................. G06F 16/254 717/136 |
| 2005/0278286 | A1 | 12/2005 | Djugash et al. |
| 2006/0004740 | A1 | 1/2006 | Dettinger et al. |
| 2006/0070046 | A1 | 3/2006 | Balakrishnan et al. |
| 2006/0074967 | A1 | 4/2006 | Shaburov |
| 2006/0080616 | A1 | 4/2006 | Vogel et al. |
| 2006/0116991 | A1 | 6/2006 | Calderwood |
| 2006/0129992 | A1 | 6/2006 | Oberholtzer et al. |
| 2006/0142949 | A1 | 6/2006 | Helt |
| 2006/0209085 | A1 | 9/2006 | Wong et al. |
| 2006/0271838 | A1 | 11/2006 | Carro |
| 2006/0271884 | A1 | 11/2006 | Hurst |
| 2006/0288046 | A1 | 12/2006 | Gupta et al. |
| 2007/0005582 | A1 | 1/2007 | Navratil et al. |
| 2007/0027851 | A1 | 2/2007 | Kruy et al. |
| 2007/0094248 | A1 | 4/2007 | McVeigh et al. |
| 2007/0113164 | A1 | 5/2007 | Hansen et al. |
| 2007/0150805 | A1 | 6/2007 | Misovski |
| 2007/0168336 | A1 | 7/2007 | Ransil et al. |
| 2007/0178501 | A1 | 8/2007 | Rabinowitz et al. |
| 2007/0192281 | A1 | 8/2007 | Cradick et al. |
| 2007/0260582 | A1 | 11/2007 | Liang |
| 2008/0059563 | A1* | 3/2008 | Bachmann ................. G06F 8/34 709/203 |
| 2008/0126344 | A1 | 5/2008 | Hoffman et al. |
| 2008/0126951 | A1 | 5/2008 | Sood et al. |
| 2008/0155440 | A1 | 6/2008 | Trevor et al. |
| 2008/0196016 | A1 | 8/2008 | Todd |
| 2008/0201313 | A1 | 8/2008 | Dettinger et al. |
| 2008/0215543 | A1 | 9/2008 | Huang et al. |
| 2008/0267386 | A1 | 10/2008 | Cooper |
| 2009/0006150 | A1 | 1/2009 | Prigge et al. |
| 2009/0007056 | A1 | 1/2009 | Prigge et al. |
| 2009/0043762 | A1 | 2/2009 | Shiverick et al. |
| 2009/0055487 | A1 | 2/2009 | Moraes et al. |
| 2009/0083275 | A1 | 3/2009 | Jacob et al. |
| 2009/0094217 | A1 | 4/2009 | Dettinger et al. |
| 2009/0144747 | A1 | 6/2009 | Baker |
| 2009/0161147 | A1 | 6/2009 | Klave |
| 2009/0172674 | A1 | 7/2009 | Bobak et al. |
| 2009/0187556 | A1 | 7/2009 | Ross et al. |
| 2009/0193012 | A1 | 7/2009 | Williams |
| 2009/0199047 | A1 | 8/2009 | Vaitheeswaran et al. |
| 2009/0248721 | A1 | 10/2009 | Burton et al. |
| 2009/0282068 | A1 | 11/2009 | Shockro et al. |
| 2009/0299830 | A1 | 12/2009 | West et al. |
| 2010/0011282 | A1 | 1/2010 | Dollard et al. |
| 2010/0070464 | A1 | 3/2010 | Aymeloglu et al. |
| 2010/0073315 | A1 | 3/2010 | Lee et al. |
| 2010/0082671 | A1 | 4/2010 | Li et al. |
| 2010/0145902 | A1 | 6/2010 | Boyan et al. |
| 2010/0161646 | A1 | 6/2010 | Ceballos et al. |
| 2010/0169376 | A1 | 7/2010 | Chu |
| 2010/0169405 | A1 | 7/2010 | Zhang |
| 2010/0199167 | A1 | 8/2010 | Uematsu et al. |
| 2010/0313119 | A1 | 12/2010 | Baldwin et al. |
| 2011/0035396 | A1 | 2/2011 | Merz et al. |
| 2011/0041084 | A1 | 2/2011 | Karam |
| 2011/0066497 | A1 | 3/2011 | Gopinath et al. |
| 2011/0074811 | A1 | 3/2011 | Hanson et al. |
| 2011/0093490 | A1 | 4/2011 | Schindlauer et al. |

(56) References Cited

U.S. PATENT DOCUMENTS

| | | | |
|---|---|---|---|
| 2011/0131547 | A1 | 6/2011 | Elaasar |
| 2011/0145401 | A1 | 6/2011 | Westlake |
| 2011/0208822 | A1 | 8/2011 | Rathod |
| 2011/0252282 | A1 | 10/2011 | Meek et al. |
| 2011/0258216 | A1 | 10/2011 | Supakkul et al. |
| 2011/0270871 | A1 | 11/2011 | He et al. |
| 2011/0321008 | A1 | 12/2011 | Jhoney et al. |
| 2012/0078595 | A1 | 3/2012 | Balandin et al. |
| 2012/0102022 | A1 | 4/2012 | Miranker et al. |
| 2012/0159449 | A1 | 6/2012 | Arnold et al. |
| 2012/0173381 | A1 | 7/2012 | Smith |
| 2012/0174057 | A1 | 7/2012 | Narendra et al. |
| 2012/0188252 | A1 | 7/2012 | Law |
| 2012/0284719 | A1 | 11/2012 | Phan et al. |
| 2013/0024268 | A1 | 1/2013 | Manickavelu |
| 2013/0024731 | A1 | 1/2013 | Shochat et al. |
| 2013/0054551 | A1 | 2/2013 | Lange |
| 2013/0086482 | A1 | 4/2013 | Parsons |
| 2013/0096968 | A1 | 4/2013 | Van Pelt et al. |
| 2013/0198624 | A1 | 8/2013 | Aymeloglu et al. |
| 2013/0225212 | A1 | 8/2013 | Khan |
| 2013/0226944 | A1 | 8/2013 | Baid et al. |
| 2013/0232220 | A1 | 9/2013 | Sampson |
| 2014/0012886 | A1 | 1/2014 | Downing et al. |
| 2014/0041059 | A1* | 2/2014 | Tsujii .................... G06F 21/44 726/30 |
| 2014/0074888 | A1 | 3/2014 | Potter et al. |
| 2014/0082033 | A1* | 3/2014 | Meriwether .......... G06F 16/182 707/827 |
| 2014/0108074 | A1 | 4/2014 | Miller et al. |
| 2014/0115589 | A1 | 4/2014 | Marinelli, III et al. |
| 2014/0115610 | A1 | 4/2014 | Marinelli, III et al. |
| 2014/0214579 | A1 | 7/2014 | Shen et al. |
| 2014/0244388 | A1 | 8/2014 | Manouchehri et al. |
| 2015/0112641 | A1 | 4/2015 | Faraj |
| 2015/0269030 | A1 | 9/2015 | Fisher et al. |
| 2016/0026923 | A1 | 1/2016 | Erenrich et al. |
| 2016/0358101 | A1* | 12/2016 | Bowers ................. G06N 20/00 |
| 2016/0358102 | A1* | 12/2016 | Bowers ................. G06N 20/00 |
| 2016/0358103 | A1* | 12/2016 | Bowers ................. G06N 20/00 |
| 2018/0349508 | A1* | 12/2018 | Bequet .................. H04L 67/10 |

FOREIGN PATENT DOCUMENTS

| | | |
|---|---|---|
| EP | 2 634 745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2013 |

OTHER PUBLICATIONS

Sirotkin et al., "Chapter 13: The Processing of Biological Sequence Data at NCBI," The NCBI Handbook, Oct. 2002, pp. 1-11.
Han et al., "Efficient Computation of Iceberg Cubes with Complex Measures," ACM Sigmod, May 21-24, 2001, pp. 1-12.
Smart et al., "A Visual Approach to Semantic Query Design Using a Web-Based Graphical Query Designer," 16th International Conference on Knowledge Engineering and Knowledge Management (EKAW 2008),ÊAcitrezza, Catania, Italy, Sep. Ê29-Oct. 3, 2008, pp. 16.
Delcher et al., "Identifying Bacterial Genes and Endosymbiont DNA with Glimmer," BioInformatics, vol. 23, No. 6, 2007, pp. 673-679.
Mendes et al., "TcruziKB: Enabling Complex Queries for Genomic Data Exploration," IEEE International Conference on Semantic Computing, Aug. 2008, pp. 432-439.
Alur et al., "Chapter 2: IBM InfoSphere DataStage Stages," IBM InfoSphere DataStage Data Flow and Job Design, Jul. 1, 2008, pp. 35-137.
Mizrachi, Ilene, "Chapter 1: GenBank: The Nuckeotide Sequence Database," The NCBI Handbook, Oct. 2002, pp. 1-14.
"A Tour of Pinboard," <http://pinboard.in/tour> as printed May 15, 2014 in 6 pages.
Goldstein et al., "Stacks Lazy Threads: Implementing a Fast Parallel Call," Journal of Parallel and Distributed Computing, Jan. 1, 1996, pp. 5-20.
Liu et al., "Methods for Mining Frequent Items in Data Streams: An Overview," Knowledge and Information Systems, vol. 26, No. 1, Jan. 2011, pp. 1-30.
Wikipedia, "Machine Code", p. 1-5, printed Aug. 11, 2014.
Kitts, Paul, "Chapter 14: Genome Assembly and Annotation Process," The NCBI Handbook, Oct. 2002, pp. 1-21.
"A Quick Guide to UniProtKB Swiss-Prot & TrEMBL," Sep. 2011, pp. 2.
Bogle et al., "Reducing Cross-Domain Call Overhead Using Batched Futures," SIGPLAN No. 29, Oct. 10, 1994 pp. 341-354.
Bogle, Phillip Lee, "Reducing Cross-Domain Call Overhead Using Batched Futures," May 1994, Massachusetts Institute of Technology, pp. 96.
Anonymous, "Frequently Asked Questions about Office Binder 97," http://web.archive.org/web/20100210112922/http://support.microsoft.com/kb/843147 printed Dec. 18, 2006 in 5 pages.
"The FASTA Program Package," fasta-36.3.4, Mar. 25, 2011, pp. 29.
Russell et al., "NITELIGHT: A Graphical Tool for Semantic Query Construction," 2008, pp. 10.
Karp et al., "A Simple Algorithm for Finding Frequent Elements in Streams and Bags," ACM Transactions on Database Systems, vol. 28, No. 1, Mar. 2003, pp. 51-D55.
Stamos et al., "Remote Evaluation," Journal ACM Transactions on Programming Languages and Systems (TOPLAS) vol. 12, Issue 4, Oct. 1990, pp. 537-564.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Bae et al., "Partitioning Algorithms for the Computation of Average Iceberg Queries," DaWaK 2000, LNCS 1874, pp. 276_286.
Wollrath et al., "A Distributed Object Model for the Java System," Proceedings of the 2nd Conference on USENEX, Conference on Object-Oriented Technologies (COOTS), Jun. 17, 1996, pp. 219-231.
Madden, Tom, "Chapter 16: The BLAST Sequence Analysis Tool," The NCBI Handbook, Oct. 2002, pp. 1-15.
Fang et al., "Computing Iceberg Queries Efficiently," Proceedings of the 24th VLDB Conference New York, 1998, pp. 299-310.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Donjerkovic et al., "Probabilistic Optimization of Top N Queries," Proceedings of the 25th VLDB Conference, Edinburgh, Scotland, 1999, pp. 411-422.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Ivanova et al., "An Architecture for Recycling Intermediates in a Column-Store," Proceedings of the 35th Sigmod International Conference on Management of Data, Sigmod '09, Jun. 29, 2009, p. 309.
Leela et al., "On Incorporating Iceberg Queries in Query Processors," Technical Report, TR-2002-01, Database Systems for Advanced Applications Lecture Notes in Computer Science, 2004, vol. 2973.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

(56) References Cited

OTHER PUBLICATIONS

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Delicious, <http://delicious.com/> as printed May 15, 2014 in 1 page.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.
Sigrist, et al., "PROSITE, a Protein Domain Database for Functional Characterization and Annotation," Nucleic Acids Research, 2010, vol. 38, pp. D161-D166.

\* cited by examiner

Validation Results for "featurize" Job

| Validation Criteria | Value | Lower Bound | Upper Bound | Is Valid? |
|---|---|---|---|---|
| featurization_exception | 1 | 0 | 0 | No |
| date_entropy | 0.79 | 0.6 | 0.8 | Yes |
| region_count_NA | 49,086 | 30,000 | 100,000 | Yes |
| region_count_EU | 76,941 | 50,000 | 250,000 | Yes |

Back to Job Configuration

*FIG. 6*

TECHNIQUES FOR CONFIGURING AND VALIDATING A DATA PIPELINE DEPLOYMENT

CROSS-REFERENCE TO RELATED APPLICATIONS; BENEFIT CLAIM

This application claims the benefit of U.S. Provisional Patent Application No. 62/527,988, filed Jun. 30, 2017, the entire contents of which is hereby incorporated by reference as if fully set forth herein, under 35 U.S.C. § 119(e).

TECHNICAL FIELD

The present disclosure relates to data pipeline systems. More specifically, the disclosure relates to configuring, validating, and/or deploying a data pipeline system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A data pipeline system is a series of jobs that each take data as input, apply business logic to the data, and output the results, typically to another job in the pipeline for further processing. A data pipeline system can be complex, requiring many interdependent jobs. Configuring a data pipeline system can be time-consuming, as it requires customizing each job in the data pipeline system. Such customization can require manual programming or implementation of each job in a programming language. However, oftentimes different data pipeline system deployments rely on a subset of similar jobs. For example, deduplication of data records can be implemented in one or more jobs. Deduplication is often needed across various data pipeline system deployments. Likewise, configuration of a machine learning system can be implemented in one or more jobs and is often needed across multiple data pipeline system deployments. What is needed is a way to easily configure a data pipeline system and reuse common jobs across data pipeline system deployments.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 6 is an example of a user interface of a deployment system, according to one embodiment.

Figure 1:
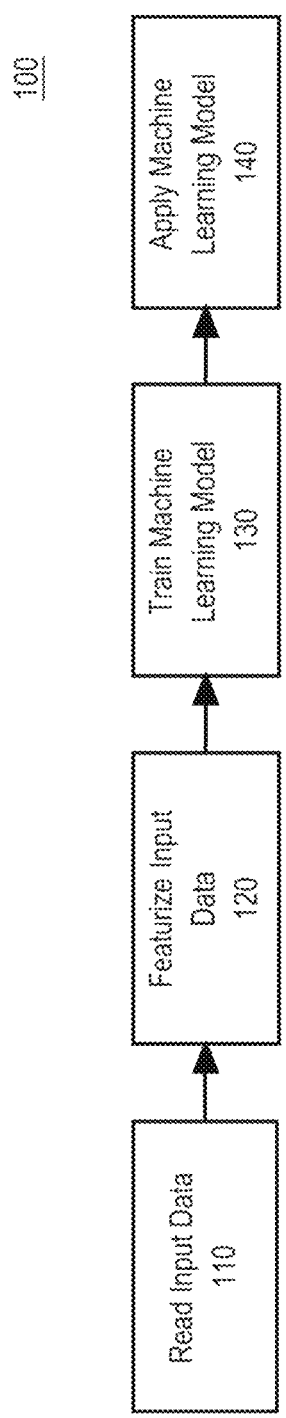
FIG. 1 is an example of a deployed data pipeline system, according to one embodiment.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
  2.1 TEMPLATES
  2.2 GRAPHICAL USER INTERFACE (GUI)
  2.3 DEPLOYMENT OF DATA PIPELINE SYSTEM
  2.4 VALIDATION
3.0 EXAMPLE PROCESS AND ALGORITHM
4.0 IMPLEMENTATION MECHANISMS—HARDWARE OVERVIEW
5.0 IMPLEMENTATION MECHANISMS—SOFTWARE OVERVIEW
6.0 OTHER ASPECTS OF DISCLOSURE

1.0 GENERAL OVERVIEW

Techniques for configuring and validating a data pipeline system deployment are described. In an embodiment, a template is a file or data object that describes a package of related jobs. For example, a template may describe a set of jobs necessary for deduplication of data records or a set of jobs performing machine learning on a set of data records. The template can be defined in a file, such as a JSON blob or XML file. For each job specified in the template, the template may identify a set of dataset dependencies that are needed as input for the processing of that job. For each job specified in the template, the template may further identify a set of configuration parameters needed for deployment of the job. The template may be used to generate and display a graphical user interface (GUI) for receiving values for the configuration parameters of each job. For each job specified in the template, the template may further identify code for processing the job, such as a particular class or function. In an embodiment, the GUI may be used to run a validation process on the underlying data to ensure accuracy of the entered configuration parameter values. The output of the validation result may be displayed via the GUI. Once finished, the GUI can be used to submit the data pipeline system for deployment. In an embodiment, a server uses the template and the configuration parameter values collected via the GUI to generate code for the package of jobs. The code may be stored in a version control system. In an embodiment, the code may be compiled, executed, and deployed to a server for processing the data.

2.0 EXAMPLE COMPUTER SYSTEM IMPLEMENTATION

A data pipeline system is a series of jobs that each take data as input, apply business logic to the data, and output the results. The results can be used as input to one or more jobs further downstream in the data pipeline system. A data pipeline system can be complex, requiring many interdependent jobs.

In the context of large scale data analytics, certain types of data pipeline systems are frequently used for different data sets. For example, data pipeline systems may be used for deduplication of data, machine learning using data, joining disparate data sources together, data type conversions, data transformations, and/or data cleanup. These data pipeline systems are merely exemplary, and other frequently-used data pipelines may exist for common data processing tasks.

FIG. 1 illustrates an example deployed data pipeline system 100 for a machine learning implementation, according to one embodiment. The data pipeline system 100 includes jobs 110, 120, 130, and 140. Deployed data pipeline system 100 is intended to be illustrative for showing the present techniques for one particular example of a frequently-used data pipeline for machine learning, but the present techniques can be applied to any frequently-used data pipeline systems.

Job 110 is programmed or configured to read input data from a one or more data sources. For example, data may be read from a database, a file system, or some other data source. The results of job 110 are then sent to job 120.

Job 120 is programmed or configured to featurize the input data received from job 110 so that it is suitable for use in a machine learning model. Featurization may include certain data cleanup tasks, normalization of data, and/or transformation of the input data into another format necessary for machine learning. The featurized data of job 120 are then sent to job 130.

Job 130 is programmed or configured to train a machine learning model using the featurized data. For example job 130 may train classifier logic on the featurized data. The classifier logic may be implemented as programs that execute one of various known types of classifiers, including a logistic regression classifier, a linear support vector machine classifier, a random forest classifier, a nearest neighbor classifier, a Bayesian classifier, a perceptron, or a neural network. The result of the training of job 130 is a machine learning model that is then sent to job 140.

Job 140 is programmed or configured to take the machine learning model from job 130 and apply it to newly received test data to generate a score.

The example of deployed data pipeline system 100 is an exemplary data pipeline system that may be used frequently for various machine learning application areas. Deploying such a data pipeline system can be time-consuming and prone to user error if it needs to be performed manually from scratch for every application area. Simplification of the deployment of a data pipeline system, such as data pipeline system 100, can improve system efficiency as well as improve the speed of deployment of data pipelines for new application areas.

Figure 2:
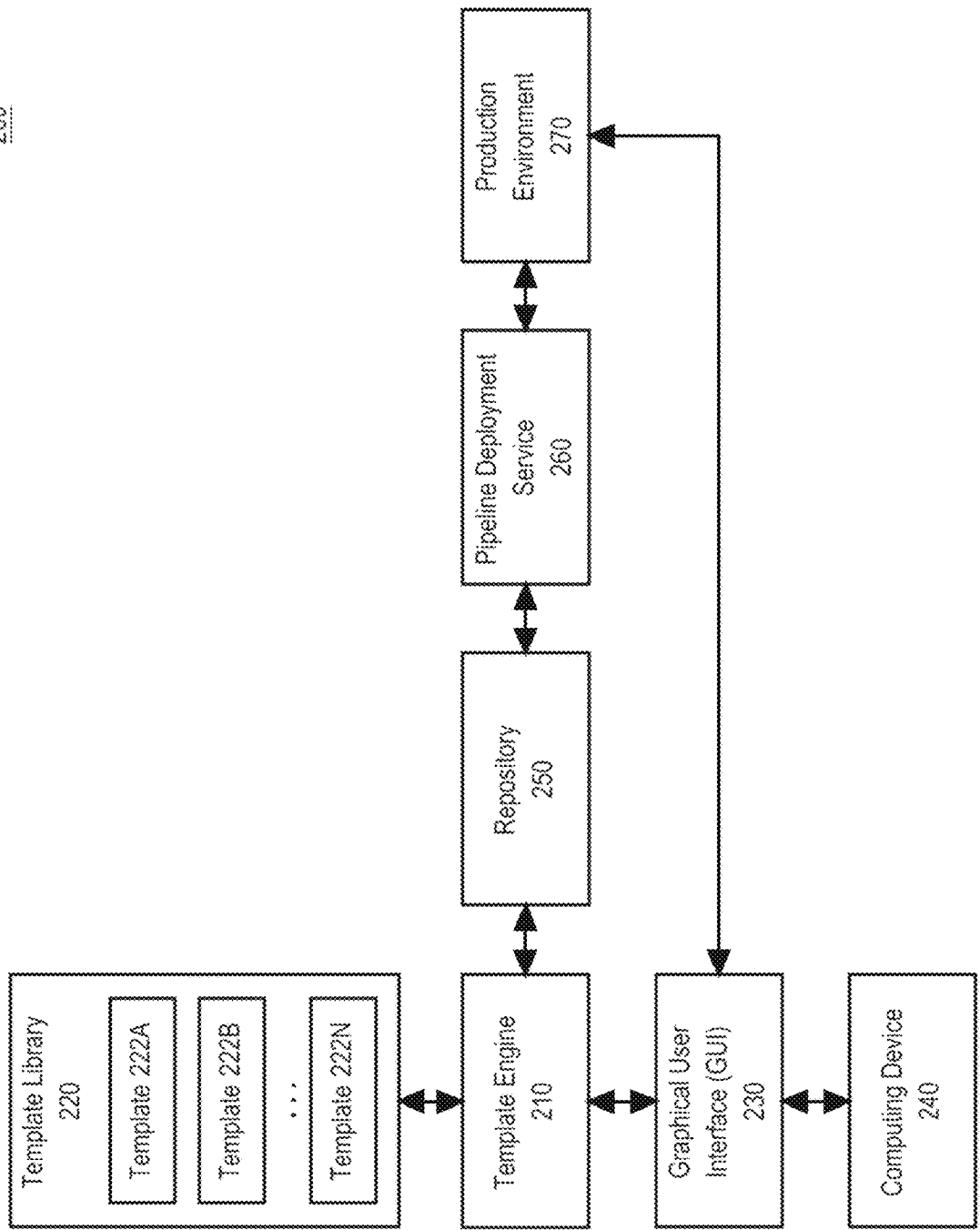
FIG. 2 is an example of a deployment system, according to one embodiment.

FIG. 2 illustrates an example of a deployment system 200 in which the techniques described herein may be practiced, according to some embodiments. In the example of FIG. 2, deployment system 200 is programmed or configured to use a template of a commonly deployed data pipeline system to assist a user in efficiently configuring, validating, and/or deploying a new data pipeline system based on the template. Deployment system 200 may be implemented across one or more physical or virtual computing devices, none of which is intended as a generic computer, since it is loaded with instructions in a new ordered combination as otherwise disclosed herein to implement the functions and algorithms of this disclosure. The example components of deployment system 200 shown in FIG. 2 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. The functions described herein are intended to indicate operations that are performed using programming in a special-purpose computer or general-purpose computer, in various embodiments. Deployment system 200 illustrates only one of many possible arrangements of components configured to execute the programming described herein. Other arrangements may include fewer or different components, and the division of work between the components may vary depending on the arrangement.

In an embodiment, deployment system 200 includes template engine 210. Template engine 210 is programmed or configured to receive a template and one or more configuration parameter values for a data pipeline system. The template engine 210 can use the template and configuration parameter values to configure, validate, and/or deploy the data pipeline system. Further details regarding the template engine 210 will be discussed herein. Template engine 210 is communicatively coupled to template library 220, repository 250, and graphical user interface (GUI) 230.

In an embodiment, deployment system 200 includes template library 220. Template library 220 stores a library of templates 222A though 222N that each store preconfigured settings for commonly deployed data pipeline systems. Further details regarding templates 222 will be discussed herein.

In an embodiment, deployment system 200 includes GUI 230. GUI 230 is programmed or configured to receive one or more configuration parameter values received from computing device 240 for use in the deployment of a data pipeline system. GUI 230 is further programmed or configured to monitor or view the status of a deployed pipeline system in production environment 270. Further details regarding GUI 230 will be discussed herein.

In an embodiment, deployment system 200 includes repository 250. Repository 250 is programmed or configured to receive and commit code received from the template engine 210 for a data pipeline system. Further details regarding repository 250 will be discussed herein. Repository 250 is communicatively coupled to pipeline deployment service 260.

In an embodiment, deployment system 200 includes pipeline deployment service 260. Pipeline deployment service 260 is programmed or configured to retrieve the committed source code from repository 250, execute it, and deploy the data pipeline system to a production environment 270. Further details regarding pipeline deployment service 260 will be discussed herein.

The present techniques provide improvements in the configuration, validation, and deployment of data pipeline systems. By unifying frequently-used data pipeline systems into templates, the deployment system is able to remove manual error in the configuration and deployment of data pipeline systems. The present techniques improve computational efficiency by minimizing inefficient implementation of frequently-used data pipeline systems and replacing them with templatized versions of the data pipeline systems that incorporate best practices and that can be customized as necessary by a user for a particular deployment.

2.1 Templates

A template is stored digital data that identifies one or more job definitions for a particular data pipeline system. In an embodiment, a template can be implemented in any markup language or data format syntax, such as extensible markup language (XML), "YAML Ain't Markup Language" (YAML), or JavaScript Object Notation (JSON), and is stored in the form of digital data in a storage device or digital memory.

One or more templates 222A through 222N may be stored in template library 220. Each template 222A through 222N may cover a frequently-used data pipeline system. For example, different templates may exist for frequent data processing tasks such as data deduplication, data cleanup, data extraction, machine learning training and classifying, joining disparate data sources together, and other frequent data processing tasks.

A job definition is a set of computer-implemented instructions that can be used for creating, executing, and/or implementing a data processing job in a data pipeline system. In an embodiment, the execution of a data processing job may generate one or more output datasets. These output datasets may in turn be used as input datasets in further data processing jobs.

In an embodiment, a job definition may include a code identifier that identifies code for processing the data processing job. For example, the code identifier may be a method call, a function call, a pointer, a data object, a library, an executable file, a script, a macro, or some other identification of a set of programming instructions for performing the data processing job.

In an embodiment, a job definition may include one or more dataset dependency identifiers that each identify an input dataset for the particular data processing job. The dataset dependency identifiers may be used to determine how the particular data processing job is dependent on one or more additional data processing jobs or the output datasets of one or more additional data processing jobs. In the example of data pipeline system 100, a dataset dependency identifier for the job definition of the featurize input data job 120 may identify the input dataset generated by read input data job 110. This dataset dependency identifier thus establishes that featurize input data job 120 is dependent on read input data job 110. Although the example of data pipeline system 100 shows a serial set of dependencies for the various jobs 110, 120, 130, and 140, in another embodiment, there may be multiple dependencies, non-serial dependencies, or another configuration of dependencies.

In an embodiment, a job definition may include one or more configuration parameters for processing a job. Configuration parameters are settings necessary for processing the job. In some embodiments, the value of a configuration parameter may be hard coded in the job definition. In some embodiments, the value of a configuration parameter may be received via GUI 230, as will be discussed herein.

In an embodiment, a template may include one or more global configuration parameters for deploying the data pipeline system. In some embodiments, the value of a configuration parameter may be hard coded in the template. In some embodiments, the value of a configuration parameter may be received via GUI 230, as will be discussed herein.

Table 1 displays an example of an excerpt of a template for performing machine learning.

TABLE 1

```
{
"root": "{{ root }}/",
"job_definitions": {
  "read_input_data": {
    "transaction_type": "TransactionType.SNAPSHOT",
    "path": "{{ root }}/Input_Data",
    "code_identifier": {
      "class": "ReadInputData",
      "parameters": {{ file_path }}
    },
    "dependencies": null,
    "schema": null
  }
  "featurize": {
    "transaction_type ": "TransactionType.SNAPSHOT",
    "path": "{{ root }}/Featurize",
    "code_identifier": {
      "class": "Featurize",
      "parameters": {
        "featurized_columns":
          {{ featurize.featurize_columns }},
        "featurizers":
          {{ featurize.comparators }}
      }
    },
    "dependencies": {
      "input": "read_input_data"
    }
    "schema": null
  }
  "train_model": {
    "transaction_type": "TransactionType.SNAPSHOT",
    "path": "{{ root }}/Train_Model",
    "code_identifier": {
      "class": "Train_model",
      "parameters": {
        "number_iterations":
          {{ train_model.iterations }},
        "classifier_model":
          {{ train_model.classifier }}
      }
    },
    "dependencies": {
      "training_data": "featurize"
    }
    "schema": null
  }
  "apply_model": {
    "transaction_type": "TransactionType.SNAPSHOT",
    "path": "{{ root }}/Apply_Model",
    "code_identifier": {
      "class": "ReadInputData",
      "parameters ": {
        "test_data": {{ test_data_filepath }}
      }
    } ,
    "dependencies": {
      "model" : "train_model"
    }
    "schema": null
  }
}
```

Table 1 illustrates an example template for data pipeline system 100, according to one embodiment. In this particular example, the template of Table 1 is written in JSON, but another markup language or syntax may be used in other embodiments. The template of Table 1 includes job definitions for four jobs: read_input_data, featurize, train_model, and apply_model which correspond to jobs 110, 120, 130, and 140 respectively. Each of the job definitions provides configuration parameters for processing jobs 110, 120, 130, and 140.

Table 1 includes a "root" tag that identifies the root directory where the data pipeline system will be deployed. The "root" tag is an example of a global configuration parameter to be used across multiple data processing jobs. The double curly brackets in this example illustrates that the root parameter is a value that will be provided by a user via GUI 230 instead of hard coded, however, in other embodiments, different syntax may be used.

Table 1 includes a featurize job definition. The job definition for the featurize job includes a "transaction_type" tag. The transaction_type defines how the output of the job is going to be used. A SNAPSHOT value for the transaction_type indicates that the output of the job will be a newly generated dataset. An APPEND value for the transaction_type indicates that the output of the job will be appended to an existing dataset (not depicted in Table 1).

The job definition for the featurize job includes a "path" tag. The path tag defines where the dataset that is going to be generated by the job is going to be output. In the example of the featurize job, the output of the job will be in a path in a subdirectory "/Featurize" under the root directory.

The job definition for the featurize job in Table 1 includes a "code_identifier" tag. The code_identifier tag defines the target code that needs to be executed in order to process the job. In this example, the class "Featurize" can be used for processing the job. The code identifier includes a "parameters" tag that identifies one or more configuration parameters for executing the code. In this example, the configuration parameters for the featurize job includes a "featurized_columns" configuration parameter and a "featurizers" configuration parameter. The curly brackets for these configuration parameters indicates that the values for these configuration parameters will be provided by a user via GUI 230. In other embodiments, the values of configuration parameters may be hard coded in the job definition itself.

The job definition for the featurize job in Table 1 includes a "dependencies" tag. The dependencies tag identifies one or more input datasets for the featurize job. In this example, the featurize job takes as an input the dataset generated by the "read_input_data" job defined earlier in the template. Thus, the featurize job will use as input the output of the read_input_data job. The dependencies information thus describes how the different jobs in a template are interrelated and/or dependent on one another. Although the example illustrated here only identifies a single dependency, in other embodiments, multiple dependencies may exist.

The job definition for the featurize job in Table 1 includes a "schema" tag. The schema tag identifies a schema for an output dataset for the job. In this case, no schema is specified for the job. In other embodiments, a schema may identify various characteristics of the output dataset, such as data types, expected values, column names, etc.

A template thus allows the deployment system 200 to use out-of-the-box configurations for frequently-used pipelines, while still allowing customization of specific configuration parameters by a user. This results efficiency and ease of deployment of a pipeline.

2.2 Graphical User Interface (GUI)

GUI 230 may be accessible by one or more computing devices 240 and will allow users to interact with the configuration, validation, and deployment of a data pipeline system. In an embodiment, template engine 210 can use a template 222 to generate a GUI 230. Template engine 210 can then receive configuration parameter values received via GUI 230.

Figure 3:
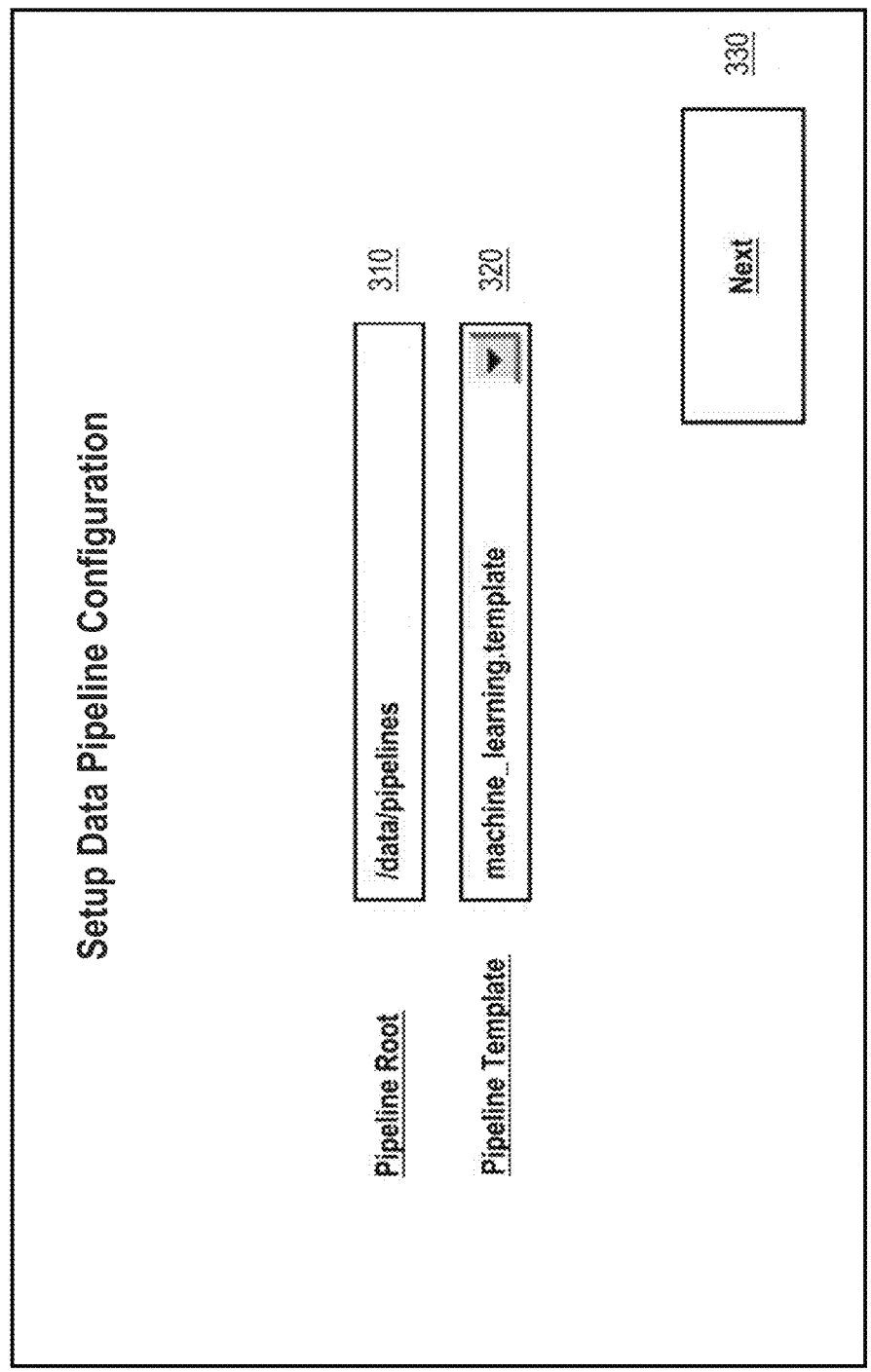
FIG. 3 is an example of a user interface of a deployment system, according to one embodiment.

FIG. 3 illustrates an example user interface 300 of GUI 230 for initial configuration of a data pipeline. In an embodiment, user interface 300 may include one or more user inputs 310 and 320 for receiving configuration values for global configuration parameters. For example, user input 310 is used to receive a value for a configuration parameter that defines the pipeline root directory. User input 320 is used to receive a value for a configuration parameter that identifies which pipeline template or pipeline templates should be used during configuration. In an embodiment, the user input 320 may include a dropdown or selection of available templates 222. Template engine 210 may retrieve the list of available templates 222 from template library 220 and display the list of available templates 222 via user input 320 to allow a user to easily select a template from available templates. User interface 300 includes a user input 330 to proceed to the next step in the pipeline configuration.

Figure 4:
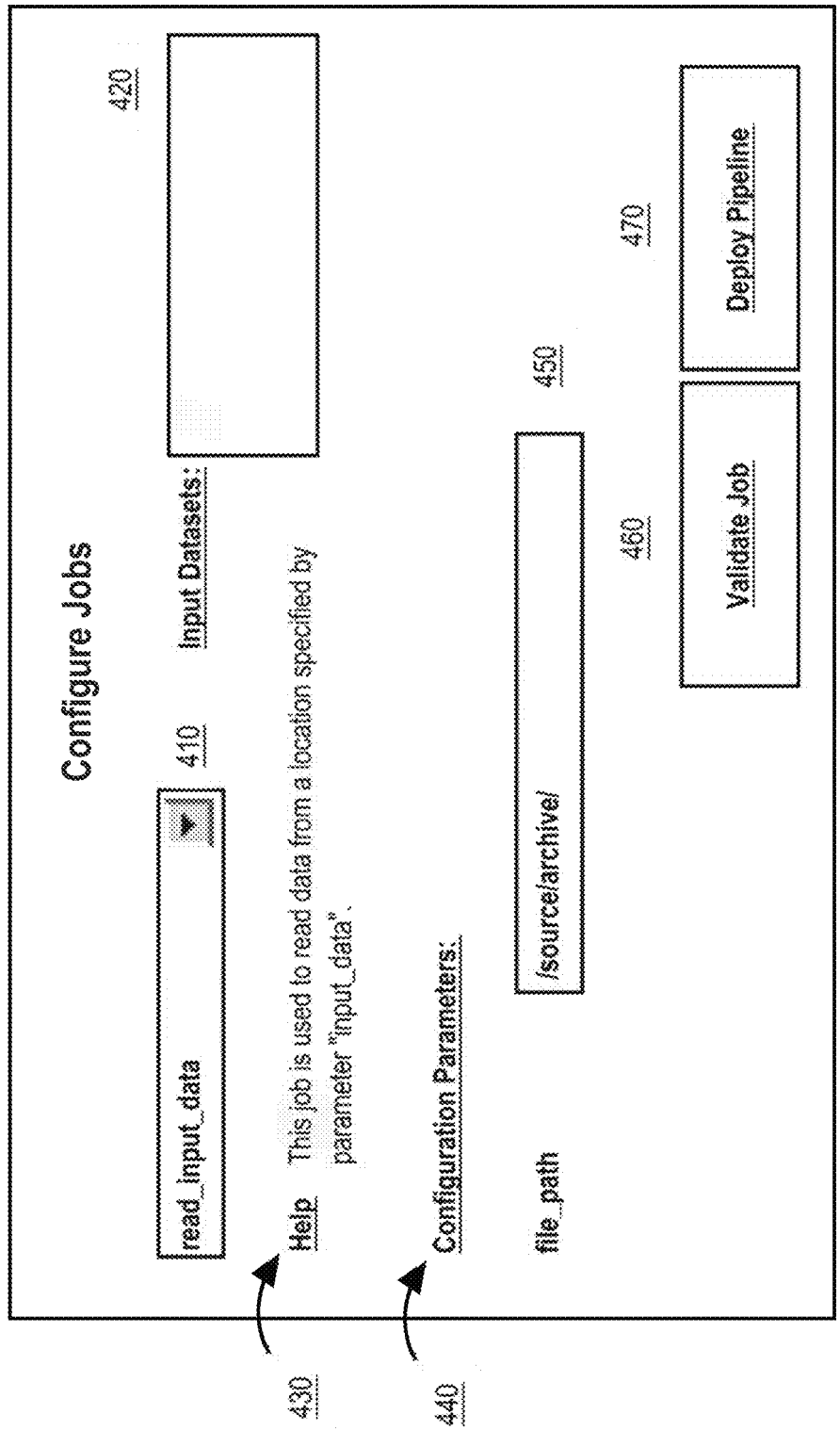
FIG. 4 is an example of a user interface of a deployment system, according to one embodiment.

FIG. 4 illustrates an example user interface 400 of GUI 230 for configuration of a particular data processing job. User interface 400 may be displayed after the user selected user input 330 in FIG. 3. The example of user interface 400 corresponds to the job definition for the read_input_data job described above with reference to Table 1. User input 410 allows a user to select which job in the data pipeline system they want to view. In this particular case, the user input 410 is set to view the read_input_data job. In an embodiment, the values of the user input 410 may include a list of one or more of the job definitions in the template that was selected with reference to user interface 300.

User interface 400 may include a display 420 that shows the input datasets for the particular data processing job. The input datasets are the dataset dependencies that are defined in the template for the particular data processing job. In this particular example, since read_input_data does not have any dataset dependencies, the value of display 420 is empty.

User interface 400 may include a help display 430 that provides a user with information regarding the data processing job. In an embodiment, the information displayed in help display 430 may be defined in the job definition of the template.

User interface 400 may include a set of configuration parameters 440. For example, configuration parameters 440 includes a user input 450 for receiving a value for the file_path parameter. In an embodiment, the contents of configuration parameters 440 may be displayed based on the job definition in the template. For example, Table 1 shows that the file_path parameter is a parameter for the read_input_data job, and the value needs to be provided by a user.

User interface 400 may include a user input 460 to perform validation of the currently selected data processing job. For example, by selecting user input 460, a user could attempt to validate the configuration parameters and other settings of the read_input_data job. Further details regarding job validation will be described herein.

User interface 400 may include a user input 470 to initiate the deployment of the data pipeline system by template engine 210. Further details regarding the deployment of the data pipeline system by template engine 210 will be described herein.

Figure 5:
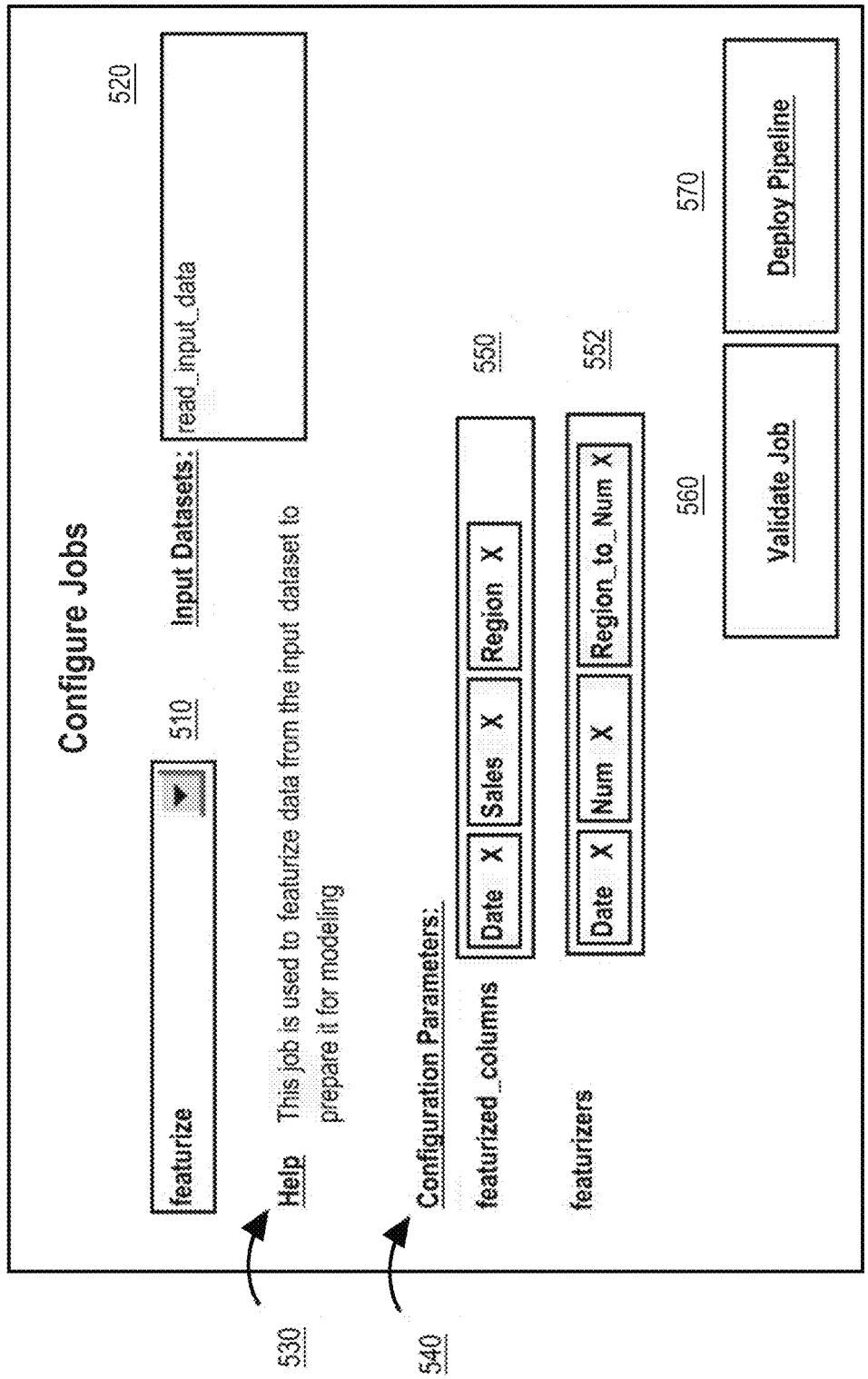
FIG. 5 is an example of a user interface of a deployment system, according to one embodiment.

FIG. 5 illustrates an example user interface 500 of GUI 230 for configuration of a particular data processing job. The example of user interface 500 corresponds to the job definition for the featurize job described above with reference to Table 1. User input 510 allows a user to select which job in the data pipeline system they want to view. In this particular case, the user input 510 is set to view the featurize job. For example, the user may have navigated to user interface 500 by selecting the "featurize" option from user input 410 in the prior user interface 400.

User interface 500 may include a display 520 that shows the input datasets for the particular data processing job. In this particular example, since the featurize job has read_input_data as a dataset dependency, display 520 shows that read_input_data is an input dataset. This allows a user to quickly see the interrelated dependencies amongst datasets and/or jobs in the data pipeline system.

User interface 500 may include a help display 530 that provides a user with information regarding the data processing job. In an embodiment, the information displayed in help display 530 may be defined in the job definition of the template.

User interface 500 may include a set of configuration parameters 540. For example, configuration parameters 540 includes a user input 550 for receiving a value for the featurized_columns parameter. Configuration parameters 540 includes a user input 552 for receiving a value for the featurizers parameter. In an embodiment, the contents of configuration parameters 540 may be displayed based on the job definition in the template. For example, Table 1 shows that featurized_columns and featurizers are parameters provided by a user for the featurize job.

User interface 500 may include a user input 560 to perform validation of the currently selected data processing job. For example, by selecting user input 560, a user could attempt to validate the configuration parameters and other settings of the featurize job. Further details regarding job validation will be described herein.

User interface 500 may include a user input 570 to initiate the deployment of the data pipeline system by template engine 210. Further details regarding the deployment of the data pipeline system by template engine 210 will be described herein.

In an embodiment, GUI 230 may also be communicatively coupled to production environment 270 and may be used to view the status and health of the deployed pipeline system in production environment 270. Further details regarding viewing the status and health of a pipeline may be found in U.S. Pat. No. 9,678,850 ("Data Pipeline Monitoring"), which is incorporated by reference as if fully set forth herein.

2.3 Deployment of Data Pipeline System

In an embodiment, template engine 220 is programmed or configured to use a template 222 for a data pipeline system in combination with one or more configuration parameter values received via GUI 230 to configure, validate, and generate a set of code for deployment of the data pipeline system.

Upon receiving a template 222 from template library 220, template engine 210 may cause to be displayed in GUI 230 one or more user interfaces for receiving configuration parameter values, such as the user interfaces displayed earlier with respect FIGS. 3, 4, and 5. Once template engine 210 has received all the necessary configuration parameter values for a template 222, template engine 210 can send the appropriate code to repository 250 for storage.

For each job definition in the template 222, template engine 210 can retrieve or execute the relevant computer code identified by the code identifier in the job definition. Template engine 210 can then use the retrieved computer code, the dataset dependencies, the configuration parameters, the values of configuration parameters received from the GUI 230, to prepare a set of jobs defined by the template for inclusion in a data pipeline system. In an embodiment, preparation of the set of jobs may include copying the relevant code, parameters, values, templates, and datasets and storing them in a repository 250.

Repository 250 is programmed or configured to serve as an archive for storing, managing, and accessing computer code and other digital data. For example, in one embodiment, repository 250 may be programmed or configured to allow for the checking in, checking out, committing, merging, branching, forking, or other management of computer code and other digital data. Computer code can be in any programming language, including, but not limited to Java, Structured Query Language (SQL), Python, Scala, etc. Repository 250 may be programmed or configured to provide version control for source code files. In one embodiment, repository 250 may be accessible via a web interface and/or a command line interface. In one embodiment, repository 250 may be implemented as a GIT repository.

Pipeline deployment service 260 is programmed or configured to retrieve computer code from repository 250 and deploy it to a production environment 270. In an embodiment, pipeline deployment service 260 is programmed or configured to compile and build the computer code, using the template, into a set of executable code, such as a JAR file, SQL file, executable file (.EXE), library, plugin, or any other form of executable code. In one embodiment, the computer code may be compiled and built into multiple sets of executable code. For example, each job definition in the template may correspond to one or more sets of executable code. In an embodiment, pipeline deployment service 260 may be implemented as a Gradle build system. The end result may be the deployment of the data pipeline system specified in the template into production environment 270.

2.4 Validation

In an embodiment, deployment system 200 may also perform validation of data processing job configurations during setup. For example, if a user selects user inputs 460 or 560, the template engine 210 can execute validation of the data processing job based on the provided configuration parameter values.

FIG. 6 illustrates an example of a validation screen for the featurize job after a user selects user input 560. Selection of user input 560 causes template engine 210 to use the provided configuration parameter values as well as the selected template, and attempts to perform validation of the data processing job based on those settings. In an embodiment, the selected source code in the job definition of the template may include one or more functions, methods, or other sequences of instructions for validation of the data processing job. The sequences of instructions for validation can be used to generate validation results 610. For example, in one embodiment, the sequence of instructions for validation may cause the data processing job, as well as any dataset dependencies or jobs, to be compiled, built, executed, and to apply specific validation criteria with the given parameter values. In an embodiment, validation criteria may be stored and/or defined in one or more of templates 222A through 222N. In another embodiment, validation criteria may be stored and/or defined in template engine 210. In another embodiment, validation criteria may be stored and/or defined in another data store coupled to template engine 210 (not depicted). In an embodiment, validation may be performed in a development environment separate from production environment 270 so that validation does not compromise production performance.

Validation results 610 shows the results of application of various validation criteria to the data processing job with the given configuration parameters and template. In the example of 610, there are four validation criteria: featurization_exception, date_entropy, region_count_NA, and region_count_EU. Each validation criteria may refer to a specific sequence of instructions to apply to the particular data processing job. The value of the validation criteria may indicate the return result for sequence of instructions. For example, in the example of featurization_exception, the validation logic found one exception when attempting to featurize the data provided by the configuration parameters. In an embodiment, the lower bound and upper bound may specify limits of acceptable values for the various validation criteria. In an embodiment, the "Is Valid?" field can show whether or not the value observed for a validation criteria is within the expected bounds.

Validation results 610 thus allows a user to quickly and easily troubleshoot the configuration of a data processing job early during configuration instead of waiting to deploy the data processing job in a production environment.

User input 630 allows a user to navigate back to the user interface 500 for the featurize job.

3.0 EXAMPLE PROCESS AND ALGORITHM

Figure 7:
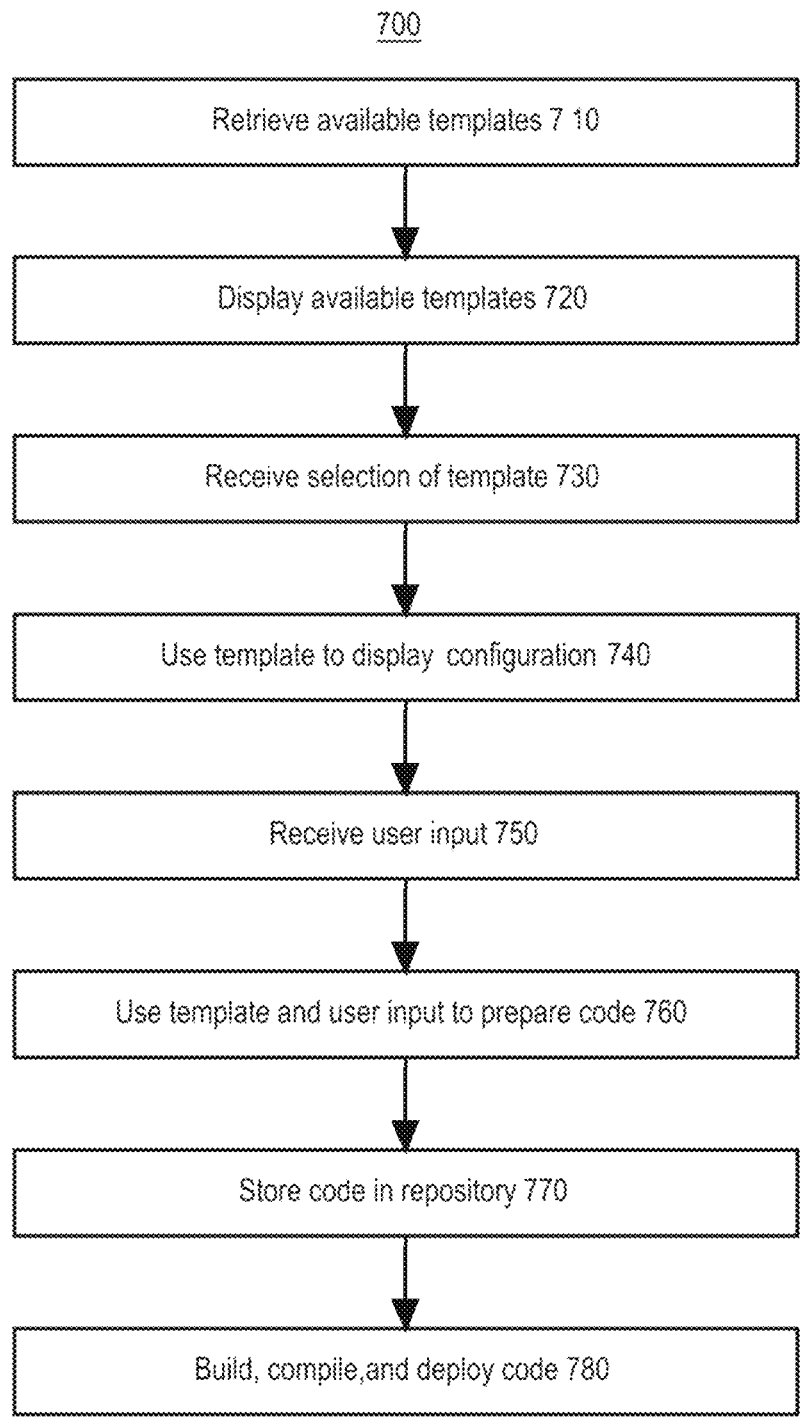
FIG. 7 is an example of a flow diagram for a process of deploying a data pipeline system, according to one embodiment.

FIG. 7 illustrates a process 700 of configuring a data pipeline system for deployment. For purposes of illustrating a clear example, FIG. 7 is described with reference to deployment system 200, but other embodiments may implement or execute the process 700 using other computer systems. FIG. 7, and each other flow diagram in this disclosure, is intended to illustrate an algorithm that can be used as the basis of programming an implementation of one or more of the claims that are set forth herein, using digital computers and a programming language or development environment, and is illustrated and described at the level at which skilled persons, in the field to which this disclosure is directed, are accustomed to communicating with one another to identify or describe programs, methods, objects and the like that can provide a working system.

In step 710, template engine 210 is programmed or configured to retrieve a list of available templates 222A through 222N stored in template library 210. Each template 222 may provide configuration parameters for a plurality of data processing jobs in a frequently-used data pipeline system. The process 700 may then proceed to step 720.

In step 720, template engine 210 is programmed or configured to display the list of available templates 222A through 222N in GUI 230. GUI 230 thus allows a user accessing a computing device 240 to easily view which data pipeline systems are frequently used, making it easier and more efficient to deploy a frequently used data pipeline system. The process 700 may then proceed to step 730.

In step 730, template engine 210 receives a user input selecting a template for configuration and deployment via GUI 230. The user input may be provided by computing device 240. Template engine 210 retrieves the template 222 selected from template library 720. Template 222 includes a plurality of job definitions for a particular data pipeline system. The process 700 may then proceed to step 740.

In step 740, template engine 210 uses template 222 to display on GUI 230 one or more user interfaces for receiving configuration parameter values for the data pipeline system and its jobs. Examples of such user interfaces include user interfaces for receiving global configuration parameter values, as in user interface 300, and for receiving global configuration parameter values for specific jobs, as in user interfaces 400 and 500. Template engine 210 uses the various values specified in the template 222 to determine what information to display in the user interfaces, including what fields require user input. The process 700 may then proceed to step 750.

In step 750, template engine 210 receives a plurality of configuration parameter values for the data pipeline system and jobs via GUI 230. The configuration parameter values may be provided via user inputs. In an embodiment, configuration parameter values may be received for global configuration parameters and/or for one or more of each job definition in the template. The configuration parameter values may be stored. The process 700 may then proceed to step 760.

In step 760, once a user has provided a user input to deploy the pipeline, template engine 210 uses the template 222 and the various configuration parameter values stored in step 750 to prepare code for the deployment of the data pipeline system. For example, the template 222 will include one or more code identifiers for every job, which specifies a set of computing instructions, such as a method, function, script, or other sequence that can be used for the particular job. Template engine 210 will retrieve the appropriate code from a source code repository (not depicted), using the template and the configuration parameter values and prepare a set of code for each of the jobs in the data pipeline system. The process 700 may then proceed to step 770.

In step 770, template engine 210 will store the necessary template, configuration parameter values, prepared code, dataset dependencies, and other necessary digital data in repository 250. The process 700 may then proceed to step 780.

In step 780, pipeline deployment service 260 will retrieve the data stored in repository 250 in step 770. Pipeline deployment service 260 will then compile, build, and deploy the code to production environment 270.

4.0 IMPLEMENTATION MECHANISMS—HARDWARE OVERVIEW

Figure 8:
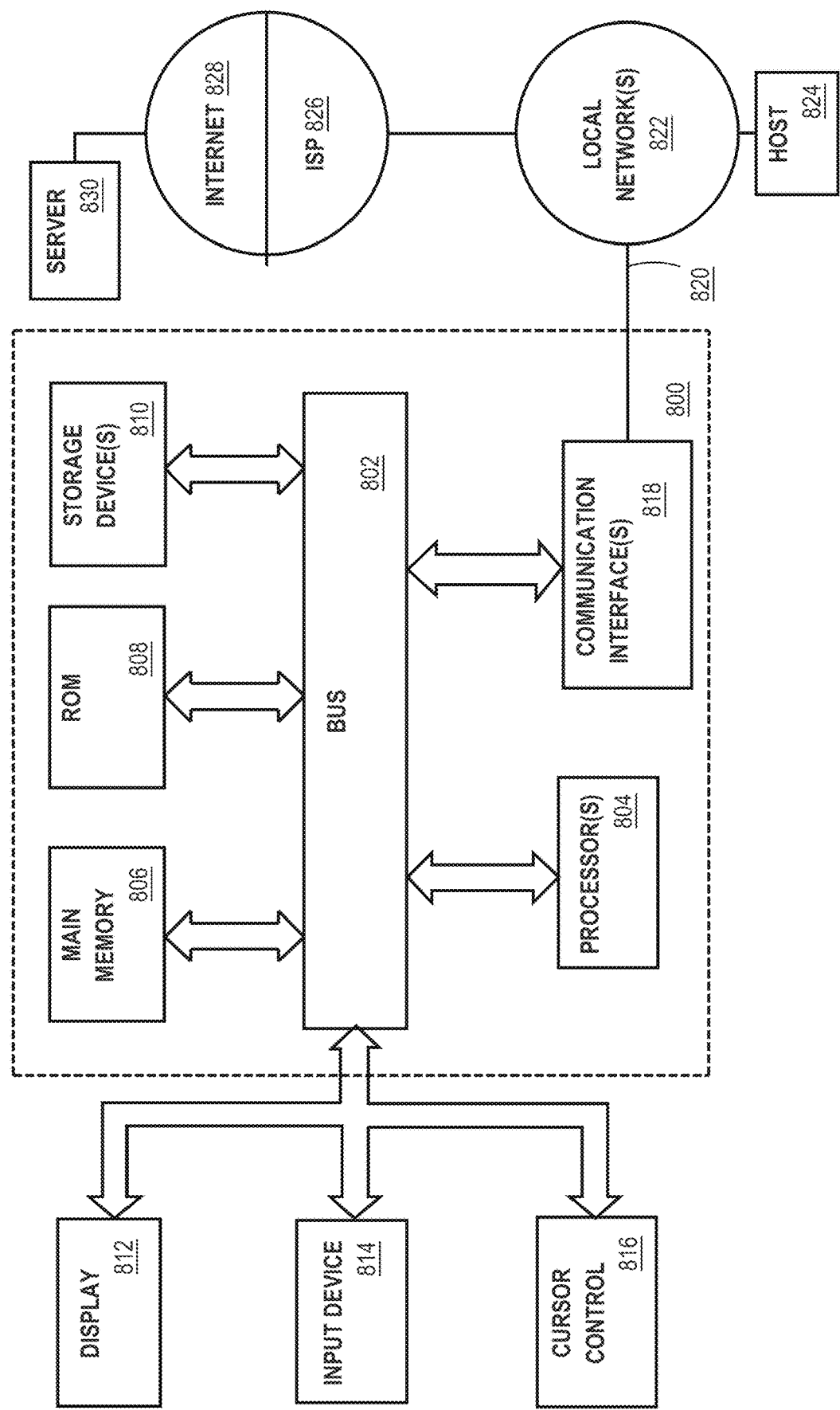
FIG. 8 is a block diagram of a computing device in which the example embodiment(s) of the present invention may be embodied.

Referring now to FIG. 8, it is a block diagram that illustrates a computing device 800 in which the example embodiment(s) of the present invention may be embodied. Computing device 800 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 800 may include a bus 802 or other communication mechanism for addressing main memory 806 and for transferring data between and among the various components of device 800.

Computing device 800 may also include one or more hardware processors 804 coupled with bus 802 for processing information. A hardware processor 804 may be a general purpose microprocessor, a system on a chip (SoC), or other processor.

Main memory 806, such as a random access memory (RAM) or other dynamic storage device, also may be coupled to bus 802 for storing information and software instructions to be executed by processor(s) 804. Main memory 806 also may be used for storing temporary variables or other intermediate information during execution of software instructions to be executed by processor(s) 804.

Software instructions, when stored in storage media accessible to processor(s) 804, render computing device 800 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 800 also may include read only memory (ROM) 808 or other static storage device coupled to bus 802 for storing static information and software instructions for processor(s) 804.

One or more mass storage devices 810 may be coupled to bus 802 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 810 (e.g., the main hard disk for the device) stores a body of program and data for directing operation of the computing device, including an operating system, user application programs, driver and other support files, as well as other data files of all sorts.

Computing device 800 may be coupled via bus 802 to display 812, such as a liquid crystal display (LCD) or other electronic visual display, for displaying information to a computer user. In some configurations, a touch sensitive surface incorporating touch detection technology (e.g., resistive, capacitive, etc.) may be overlaid on display 812 to form a touch sensitive display for communicating touch gesture (e.g., finger or stylus) input to processor(s) 804.

An input device 814, including alphanumeric and other keys, may be coupled to bus 802 for communicating information and command selections to processor 804. In addition to or instead of alphanumeric and other keys, input device 814 may include one or more physical buttons or switches such as, for example, a power (on/off) button, a "home" button, volume control buttons, or the like.

Another type of user input device may be a cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

While in some configurations, such as the configuration depicted in FIG. 8, one or more of display 812, input device 814, and cursor control 816 are external components (i.e., peripheral devices) of computing device 800, some or all of display 812, input device 814, and cursor control 816 are integrated as part of the form factor of computing device 800 in other configurations.

Functions of the disclosed systems, methods, and modules may be performed by computing device 800 in response to processor(s) 804 executing one or more programs of software instructions contained in main memory 806. Such software instructions may be read into main memory 806 from another storage medium, such as storage device(s) 810. Execution of the software instructions contained in main memory 806 cause processor(s) 804 to perform the functions of the example embodiment(s).

While functions and operations of the example embodiment(s) may be implemented entirely with software instructions, hard-wired or programmable circuitry of computing device 800 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more software instructions to processor(s) 804 for execution. For example, the software instructions may initially be carried on a magnetic disk or solid-state drive of a remote computer. The remote computer can load the software instructions into its dynamic memory and send the software instructions over a telephone line using a modem. A modem local to computing device 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor(s) 804 retrieves and executes the software instructions. The software instructions received by main memory 806 may optionally be stored on storage device(s) 810 either before or after execution by processor(s) 804.

Computing device 800 also may include one or more communication interface(s) 818 coupled to bus 802. A communication interface 818 provides a two-way data communication coupling to a wired or wireless network link 820 that is connected to a local network 822 (e.g., Ethernet network, Wireless Local Area Network, cellular phone network, Bluetooth wireless network, or the like). Communication interface 818 sends and receives electrical, electromagnetic, or optical signals that carry digital data streams representing various types of information. For example, communication interface 818 may be a wired network interface card, a wireless network interface card with an integrated radio antenna, or a modem (e.g., ISDN, DSL, or cable modem).

Network link(s) 820 typically provide data communication through one or more networks to other data devices. For example, a network link 820 may provide a connection through a local network 822 to a host computer 824 or to data equipment operated by an Internet Service Provider (ISP) 826. ISP 826 in turn provides data communication services through the world wide packet data communication network now commonly referred to as the "Internet" 828. Local network(s) 822 and Internet 828 use electrical, electromagnetic or optical signals that carry digital data streams. The signals through the various networks and the signals on network link(s) 820 and through communication interface(s) 818, which carry the digital data to and from computing device 800, are example forms of transmission media.

Computing device 800 can send messages and receive data, including program code, through the network(s), network link(s) 820 and communication interface(s) 818. In the Internet example, a server 830 might transmit a requested code for an application program through Internet 828, ISP 826, local network(s) 822 and communication interface(s) 818.

The received code may be executed by processor 804 as it is received, and/or stored in storage device 810, or other non-volatile storage for later execution.

5.0 IMPLEMENTATION MECHANISMS—SOFTWARE OVERVIEW

Figure 9:
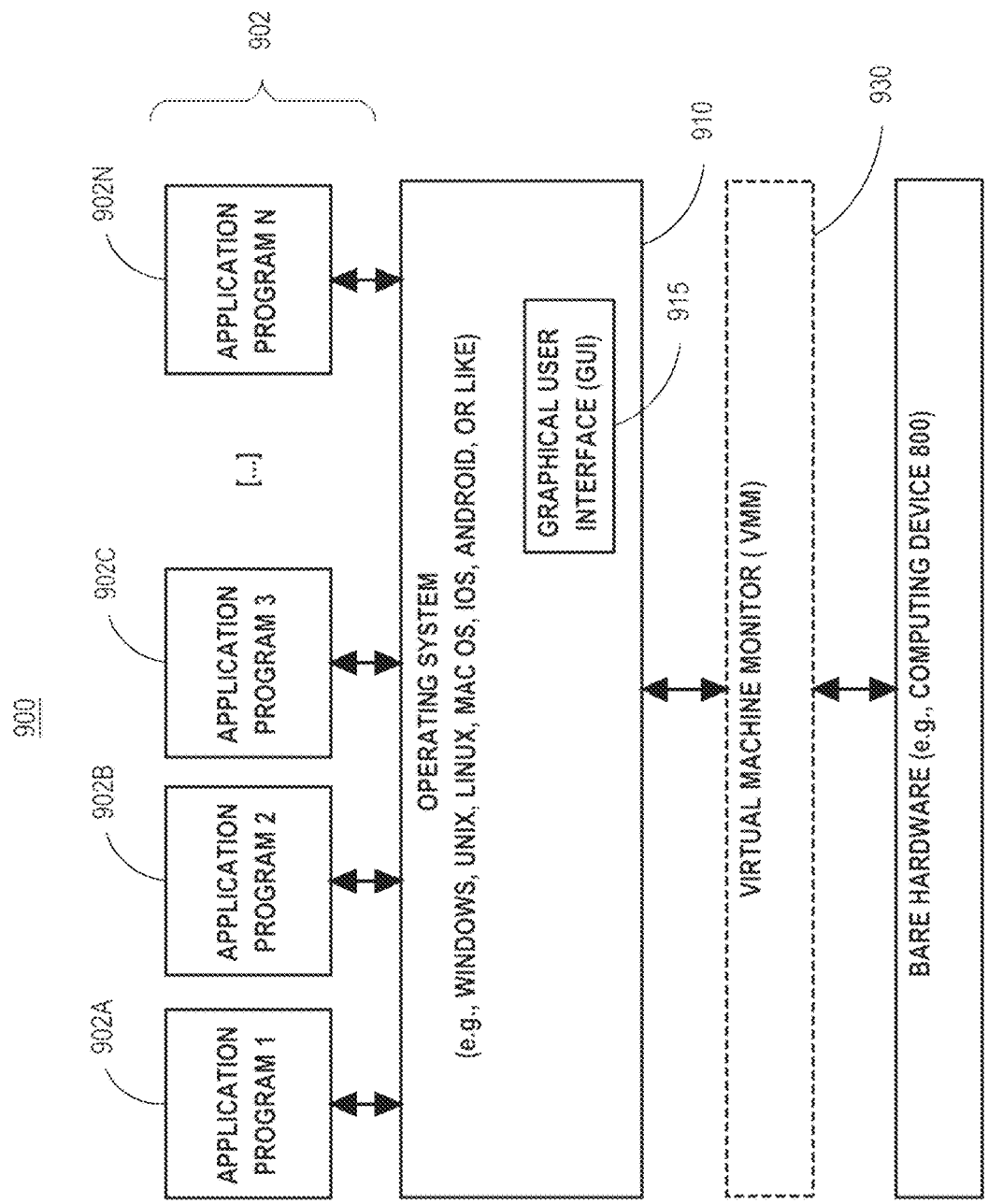
FIG. 9 is a block diagram of a software system for controlling the operation of the computing device.

FIG. 9 is a block diagram of a software system 900 that may be employed for controlling the operation of computing device 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing device 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on device 900 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of device 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the device 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMI 930 presents the guest operating systems with a virtual operating platform and manages the execution of the guest operating systems.

In some instances, the VMM 930 may allow a guest operating system to run as if it is running on the bare hardware 920 of device 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 OTHER ASPECTS OF DISCLOSURE

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:
1. A method, comprising:
receiving a template that defines a plurality of job definitions;

wherein each particular job definition of the plurality of job definitions corresponds to a particular data processing job, and wherein each particular job definition comprises:
  a code identifier that identifies code for processing the particular data processing job;
  a plurality of dataset dependency identifiers that identify a plurality of input datasets for the particular data processing job;
  a plurality of configuration parameters for processing the particular data processing job;
for each particular job definition of the plurality of job definitions:
  based on the template, causing to be displayed a user interface for receiving a plurality of configuration parameter values for the plurality of configuration parameters for the particular job definition;
  receiving the plurality of configuration parameter values for the particular job definition;
  executing the corresponding particular data processing job for the particular job definition by executing the code for processing the particular data processing job, by using the input datasets for the particular data processing job and the plurality of configuration parameter values;
in response to a command to perform a validation of a target data processing job that corresponds to a target job definition of the plurality of job definitions,
executing the target data processing job for the target job definition by executing the code for processing the target data processing job, by using the input datasets for the target data processing job and the plurality of configuration parameter values for the target data processing job;
applying one or more validation criteria to the target data processing job to generate a validation value that indicates a metric of accuracy of the plurality of configuration parameter values for the target data processing job;
wherein the method is performed using one or more processors.

2. The method of claim 1, wherein the method further comprises:
  receiving a list of a plurality of available templates;
  causing to be displayed in the user interface the plurality of available templates;
  receiving a user input for selection of the template from the plurality of available templates.

3. The method of claim 1, wherein the method further comprises:
  receiving a global configuration parameter value that applies to each job definition of the plurality of job definitions;
  using the global configuration parameter value in the step of executing each of the corresponding particular data processing jobs.

4. The method of claim 1, wherein the method further comprises:
  comparing the validation value to a pre-stored lower bound value and upper bound value;
  based on the comparison, displaying whether the validation value is within the lower bound value and upper bound value.

5. The method of claim 1, wherein the plurality of job definitions define a data pipeline system for deduplication of data records.

6. The method of claim 1, wherein the plurality of job definitions define a data pipeline system for featurizing, training, and applying a machine learning model.

7. The method of claim 1, wherein the plurality of job definitions define a data pipeline system for data cleanup of data records.

8. The method of claim 1, wherein the plurality of job definitions define a data pipeline system for joining of data sources.

9. The method of claim 1, wherein the method further comprises:
  prior to executing the corresponding particular data processing job, storing the code for processing the particular data processing job, the input datasets for the particular data processing job, and the plurality of configuration parameter values in a code repository with version control.

10. One or more non-transitory computer-readable media storing instructions, wherein the instructions, when executed by one or more hardware processors, cause:
  receiving a template that defines a plurality of job definitions;
  wherein each particular job definition of the plurality of job definitions corresponds to a particular data processing job, and wherein each particular job definition comprises:
    a code identifier that identifies code for processing the particular data processing job;
    a plurality of dataset dependency identifiers that identify a plurality of input datasets for the particular data processing job;
    a plurality of configuration parameters for processing the particular data processing job;
  for each particular job definition of the plurality of job definitions:
    based on the template, causing to be displayed a user interface for receiving a plurality of configuration parameter values for the plurality of configuration parameters for the particular job definition;
    receiving the plurality of configuration parameter values for the particular job definition;
    executing the corresponding particular data processing job for the particular job definition by executing the code for processing the particular data processing job, by using the input datasets for the particular data processing job and the plurality of configuration parameter values;
  in response to a command to perform a validation of a target data processing job that corresponds to a target job definition of the plurality of job definitions,
  executing the target data processing job for the target job definition by executing the code for processing the target data processing job, by using the input datasets for the target data processing job and the plurality of configuration parameter values for the target data processing job;
  applying one or more validation criteria to the target data processing job to generate a validation value that indicates a metric of accuracy of the plurality of configuration parameter values for the target data processing job.

11. The one or more non-transitory computer-readable media of claim 10, wherein the instructions further comprise instructions for:
  receiving a list of a plurality of available templates;
  causing to be displayed in the user interface the plurality of available templates;

receiving a user input for selection of the template from the plurality of available templates.

12. The one or more non-transitory computer-readable media of claim 10, wherein the instructions further comprise instructions for:
   receiving a global configuration parameter value that applies to each job definition of the plurality of job definitions;
   using the global configuration parameter value in the step of executing each of the corresponding particular data processing jobs.

13. The one or more non-transitory computer-readable media of claim 10, wherein the instructions further comprise instructions for:
   comparing the validation value to a pre-stored lower bound value and upper bound value;
   based on the comparison, displaying whether the validation value is within the lower bound value and upper bound value.

14. The one or more non-transitory computer-readable media of claim 10, wherein the plurality of job definitions define a data pipeline system for deduplication of data records.

15. The one or more non-transitory computer-readable media of claim 10, wherein the plurality of job definitions define a data pipeline system for featurizing, training, and applying a machine learning model.

16. The one or more non-transitory computer-readable media of claim 10, wherein the plurality of job definitions define a data pipeline system for data cleanup of data records.

17. The one or more non-transitory computer-readable media of claim 10, wherein the plurality of job definitions define a data pipeline system for joining of data sources.

18. The one or more non-transitory computer-readable media of claim 10, wherein the instructions further comprise instructions for:
   prior to executing the corresponding particular data processing job, storing the code for processing the particular data processing job, the input datasets for the particular data processing job, and the plurality of configuration parameter values in a code repository with version control.

* * * * *